Dec. 12, 1961 E. N. MARTIN 3,012,763
MIXING MACHINE
Filed May 16, 1958
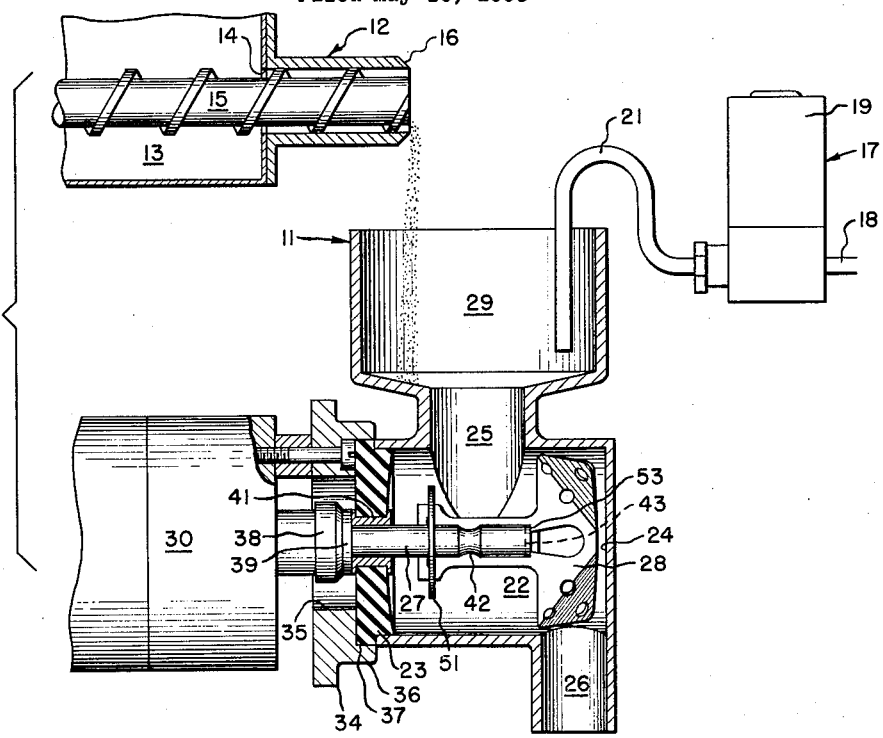
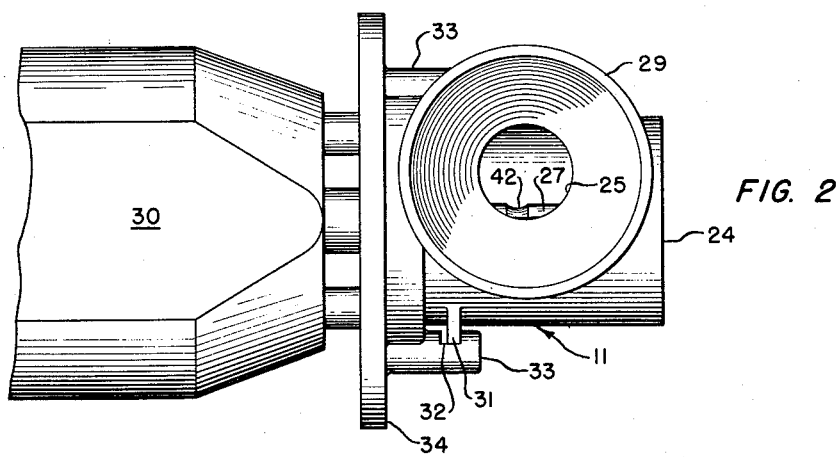
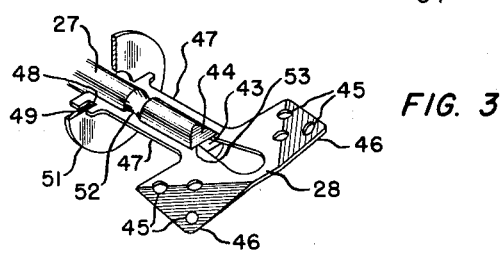
INVENTOR.
ERNEST N. MARTIN
BY Fulwider, Mattingly
and Huntley
ATTORNEYS United States Patent Office 3,012,763
Patented Dec. 12, 1961

3,012,763
MIXING MACHINE
Ernest N. Martin, 1141 High St., Escondido, Calif., assignor to Barmart, San Marcos, Calif., a partnership consisting of S. Morgan Barber and Ernest N. Martin
Filed May 16, 1958, Ser. No. 735,786
1 Claim. (Cl. 259—136)

The present invention relates to a mixing machine, and more particularly to a mixing machine having a propeller vane type of mixing impeller.

Although the mixing machine of the present invention is adapted to receive a variety of materials for the mixing thereof, it is particularly adapted for and will be described in connection with the mixture of liquid and powdered materials to produce a drink or beverage. Thus, for example, a receiving vessel of the mixer accepts heated water and a powdered chocolate material and affords a pre-mixing action by reason of the shape of the receiving funnel of the mixer. This action improves the efficiency of a mixing impeller which is operative within the main mixing chamber into which the pre-mix material proceeds.

The mixing impeller embodies novel blade elements for better mixing of the powdered and liquid materials, and is held in position upon the impeller shaft by unique retaining means which afford simple and expeditious securement therebetween. In addition, it is of particular importance in the present invention that these blade elements are out of alignment with the inlet port to the impeller mixing chamber, and in alignment with the discharge port. In this manner a desirable suction effect is provided to draw in unmixed materials, while a pressure head is afforded at the outlet port to facilitate and speed discharge of mixed materials.

The various elements of the mixer of the present invention are straightforward in design, easy to manufacture, and the assembly thereof is uncomplicated; making cleaning and maintenance of the mixer an easy task.

Other objects and features of the present invention will be readily apparent to those skilled in the art from the following specification and appended drawings wherein is illustrated a preferred form of the invention, and in which:

In the drawings:

FIG. 1 is an elevational view, partially in section, of the mixer of the present invention, together with a showing of typical feed units;

FIG. 2 is a plan view of the mixer; and

FIG. 3 is a detailed perspective view of the mixing impeller, and the means for securing it in position upon the impeller shaft.

Referring to the drawings, and more particularly to FIGS. 1 and 2, there is illustrated a mixing machine, generally designated 11, adapted to receive and mix heated liquid and powdered material to produce a hot drink or beverage. Thus, there is illustrated a powdered chocolate feed means 12 which includes a walled vessel forming a chamber 13. Operable within chamber 13 and through an outlet 14 is an auger 15 for moving predetermined quantities of powdered material from chamber 13 and out of a spout 16. Likewise, a liquid feed means 17 is illustrated. Feed means 17 is operative to accept heated liquid such as water from a hot water pipe 18, and, upon operation of a usual solenoid valve 19, direct this heated water from a feed pipe 21 to mixer 11. Neither feed means 12 nor 17 form a part of the present invention and for this reason they will not be described in detail, being mentioned only to afford a better understanding of the operation of mixer 11.

Mixer 11 comprises, generally, means forming a horizontally elongated chamber 22 having a pair of end walls 23 and 24, an inlet opening 25 intermediate walls 23 and 24, and a discharge opening 26 adjacent end wall 24. Mixer 11 also includes a rotatable shaft 27 extending through end wall 23, and a mixing impeller 28 carried by shaft 27 and located above discharge opening 26 and adjacent to end wall 24.

More specifically, the means forming chamber 22 include a receiving chamber or funnel 29 which is cylindrical in shape and which slopes inwardly at its base so as to empty its contents into inlet opening 25. As will be apparent in FIG. 1, the powdered material from feed means 12 is dropped into the funnel 29 to one side of opening 25, that is, out of alignment therewith, and liquid from feed pipe 21 is similarly discharged into funnel 29 near the periphery thereof. In this manner a pre-mixing action is provided within funnel 29 before the contents drop or are sucked into mixing chamber 22. In addition, the vertical axis of opening 25 is spaced from the horizontal centerline of chamber 22, as best seen in FIG. 2, whereby a swirling, feeding of the contents of funnel 29 is made into chamber 22.

It is noted that the walls of chamber 22 are integral with funnel 29 and end wall 24, and that end wall 23 of chamber 22 is formed by a seal made of rubber or similar elastomeric or resilient sealing material. Thus, during the mixing operation the contents of mixing chamber 22 are sealed against flow to the left past shaft 27, and exit is only through opening 26 by reason of the action of impeller 28.

The cylindrical wall of chamber 22 is provided at its left end with a plurality of tabs or ears 31 on the exterior thereof. These ears 31 are engageable with a pair of slots 32 formed, respectively, in a pair of posts 33 which are integrally formed with and extend from a mounting plate 34. Plate 34 is rigidly bolted or otherwise secured to the frame of any suitable motor 30, such as an alternating current, high r.p.m. type, which is adapted to rapidly rotate impeller shaft 27.

Plate 34 has a central bore 35 therethrough to accommodate shaft 27, plate 34 also being provided with an annular portion 36 which extends to the right, as viewed in FIG. 1. Portion 36 is recessed to form an annular internal shoulder 37 upon which seal 23 rests. Thus, to assemble chamber 22 to plate 34, these elements must be urged together sufficiently to overcome the resilience or bias of seal 23, and then rotated with respect to each other until tabs 31 are housed within the slots 32 of posts 33. The resilience of seal 23 then maintains this relation while also effecting a fluid tight seal.

A mechanical seal 38 is keyed to shaft 27, and is internally bored to accept a bearing material 39, such as tetrafluoroethylene or nylon or the like. The material 39 is held in this position by any suitable means, such as by staking, material 39 rotating against the leftward face of a sleeve-like member 41 which carries seal 23 and which acts as a bearing for shaft 27.

Shaft 27, which is coupled to and driven by the shaft of motor 30, is provided with a reduced diameter portion 42 for a purpose which will become evident. Shaft 27 is also provided with a slot 43 at its end, one of the pair of end portions formed by the slotting of shaft 27 being cut off on a bias, as best seen in FIG. 3 at 44. Portion 42 and slot 43 serve to accept the mixing impeller 28, and by reason of their construction, as will be seen, permit quick disassembly when desired.

Impeller 28 is preferably formed of a flat piece of metal which is provided with a plurality of punched holes 45 for greater effectiveness in mixing the ingredients accepted within the chamber 22. The blades 46 of the impeller are formed by bending the apertured tabs as illustrated. It is noted that the pitch of these tabs is such that as impeller 28 is rotated the mixed ingredients are urged outwardly and to the right, building up a pressure head at wall 24, thereby producing a highly homogenized mixture and facilitating discharge of the mixed material out of opening 26. Thus, as impeller 28 is rotated, the holes 45, together with the pressure built up by the whirling impeller tabs, cause an aeration of the liquid-powdered solid mixture, producing a desirable foam-like beverage mixture.

The left end of impeller 28 includes a pair of horizontally extending legs 47 which are biased outwardly by the resilience of the sheet metal of which impeller 28 is preferably made. Legs 47 are provided at their left ends with slots 48 which mate with slots 49 formed in a retainer or annular washer 51. In this manner washer 51 is carried by the outward bias of legs 47 of impeller 28, and washer 51 in turn serves to limit the outward movement of legs 47.

The assembly of impeller 28 and washer 51 may be quickly snapped into position upon impeller shaft 27 by sliding washer 51 over the end of shaft 27, washer 51 having a central opening just large enough to slidably fit thereover. At this point, impeller 28 cannot be urged to the left onto shaft 27 because of the interference with shaft 27 of a pair of internal tabs 52 provided upon the inside edges of legs 47. Obviously, once assembled, these tabs 52 also prevent accidental disconnection between impeller 28 and shaft 27. However, in assembly, impeller 28 can be urged onto shaft 27 by placing impeller 28 at an angle to shaft 27 to thereby locate tabs 52 at the outside of shaft 27. Impeller 28 is then slid over shaft 27 until tabs 52 come into register with the reduced diameter portion 42 of shaft 27, at which point impeller 28 may be pivoted and moved into alignment with shaft 27. This places a pair of internal shoulders 53 into position adjacent the slot 43 of shaft 27, and impeller 28 may be then urged to the left to snap shoulders 53 into position within slot 43.

It will be noted that upon energization of motor 30 the action of impeller 28 will be to discharge mixed materials out of the opening 26 which is immediately adjacent to impeller 28. The location of impeller 28 is, however, to the right of inlet opening 25 so that mixed materials are not thrown out of that opening. Instead, materials to be mixed are sucked through opening 25 and into chamber 22. The mixed materials are then drawn out of outlet opening 26, and chamber 22 may be tipped to the right slightly to facilitate this discharge through opening 26.

While certain preferred embodiments of the invention have been specifically disclosed, it is understood that the invention is not limited thereto, as many variations will be readily apparent to those skilled in the art, and the invention is to be given its broadest possible interpretation within the terms of the following claim.

I claim:

An impeller for a mixing machine comprising a rotatable shaft adapted for support at one end and having a free end and provided at its free end with a diametral slot, said shaft also being provided with a reduced diameter portion inwardly spaced from said diametral slot; a mixing impeller carried by said shaft and keyed in position by said diametral slot, said impeller being provided with a pair of spaced legs having protruding tabs at their inside edges, said tabs being adapted to seat within said reduced diameter portion of said shaft, said legs being provided at their inner ends with slots; and a retainer adapted to mate with said slots of said legs to prevent said legs from being moved away from each other sufficiently to permit axial movement of said impeller out of keyed relationship with said shaft.

References Cited in the file of this patent
UNITED STATES PATENTS

| | | |
|---|---|---|
| 988,412 | Valerius | Apr. 4, 1911 |
| 1,045,916 | Twining | Dec. 3, 1912 |
| 1,437,246 | Horton | Nov. 28, 1922 |
| 1,873,596 | Jones | Aug. 3, 1932 |
| 2,377,069 | Brubacker | May 29, 1945 |
| 2,505,125 | List | Apr. 25, 1950 |
| 2,633,170 | Balmain | Mar. 31, 1953 |
| 2,637,537 | Ernst | May 5, 1953 |
| 2,639,904 | McMaster et al. | May 26, 1953 |
| 2,654,322 | Olsen | Oct. 6, 1953 |
| 2,738,175 | Nycander et al. | Mar. 13, 1956 |
| 2,774,577 | Anderson et al. | Dec. 18, 1956 |
| 2,839,277 | Rishoi et al. | June 17, 1958 |
| 2,853,321 | Davey | Sept. 23, 1958 |